United States Patent
Lance et al.

(10) Patent No.: US 11,754,351 B2
(45) Date of Patent: Sep. 12, 2023

(54) SENSOR THERMAL MANAGEMENT AND STABILIZATION UTILIZING VARIABLE CONDUCTANCE

(71) Applicant: Honeywell International Inc., Morris Plains, NJ (US)

(72) Inventors: Wayne Lance, Largo, FL (US); Joseph McMahan, St. Petersburg, FL (US)

(73) Assignee: Honeywell International Inc., Charlotte, NC (US)

( * ) Notice: Subject to any disclaimer, the term of this patent is extended or adjusted under 35 U.S.C. 154(b) by 221 days.

(21) Appl. No.: 16/569,551

(22) Filed: Sep. 12, 2019

(65) Prior Publication Data

US 2021/0080198 A1 Mar. 18, 2021

(51) Int. Cl.
  *F28F 13/00* (2006.01)
  *G01P 1/02* (2006.01)
  *G01P 15/02* (2013.01)

(52) U.S. Cl.
  CPC .............. *F28F 13/00* (2013.01); *G01P 1/023* (2013.01); *G01P 15/02* (2013.01); *F28F 2013/006* (2013.01); *F28F 2013/008* (2013.01)

(58) Field of Classification Search
  CPC ................. F28F 13/00; F28F 2013/006; F28F 2013/008; F28F 2265/10; F28F 2270/00; G01P 1/023; G01P 15/02
  See application file for complete search history.

(56) References Cited

U.S. PATENT DOCUMENTS

| | | | | |
|---|---|---|---|---|
| 3,229,755 A | * | 1/1966 | Komarow | G01K 5/32 374/E5.019 |
| 3,399,717 A | * | 9/1968 | Cline | F28F 13/00 165/276 |
| 3,413,584 A | * | 11/1968 | Piacent | H01H 37/14 337/100 |
| 3,463,224 A | * | 8/1969 | Myers | B64G 1/50 165/276 |
| 3,478,819 A | * | 11/1969 | Reinke | H05B 1/0208 165/277 |
| 3,519,067 A | * | 7/1970 | Schmidt | F28F 13/00 165/272 |
| 3,543,839 A | * | 12/1970 | Shlosinger | F28D 15/0266 165/274 |
| 3,957,107 A | * | 5/1976 | Altoz | F28D 15/06 165/276 |

(Continued)

*Primary Examiner* — Eric S Ruppert
*Assistant Examiner* — Hans R Weiland
(74) *Attorney, Agent, or Firm* — Fogg & Powers LLC

(57) ABSTRACT

A system for sensor thermal management and stabilization comprises a sensor block, one or more sensors mounted on the sensor block, one or more heaters mounted on the sensor block, a chassis coupled to the sensor block, a thermal conductor moveably coupled between the sensor block and the chassis, and a thermal control actuation mechanism operatively connected to the thermal conductor. The thermal control actuation mechanism is operative to cause the thermal conductor to vary a total thermal conductance from the sensor block to the chassis by moving the thermal conductor toward the chassis or away from the chassis. The total thermal conductance is varied to provide an optimized thermal stability and optimized environmental range of applicability for the one or more sensors.

17 Claims, 3 Drawing Sheets

(56) References Cited

U.S. PATENT DOCUMENTS

| | | | | |
|---|---|---|---|---|
| 4,281,708 A * | 8/1981 | Wing | ............... | G05D 23/01 |
| | | | | 165/277 |
| 5,390,734 A * | 2/1995 | Voorhes | ............ | F28F 13/00 |
| | | | | 165/185 |
| 5,535,815 A * | 7/1996 | Hyman | ............ | F28F 13/00 |
| | | | | 165/277 |
| 6,060,166 A * | 5/2000 | Hoover | .......... | B29C 70/546 |
| | | | | 428/408 |
| 6,230,790 B1 | 5/2001 | Hemingway et al. | | |
| 9,923,252 B2 | 3/2018 | Nubbe et al. | | |
| 9,992,911 B1 | 6/2018 | Buckman et al. | | |
| 10,101,099 B2 | 10/2018 | Benthem et al. | | |
| 10,225,953 B2 | 3/2019 | Gernert et al. | | |
| 2003/0008286 A1* | 1/2003 | Zou | .................. | F28F 13/00 |
| | | | | 435/6.12 |
| 2008/0049398 A1* | 2/2008 | Griffiths | ............ | F28F 13/00 |
| | | | | 361/704 |
| 2010/0152066 A1* | 6/2010 | Malik | ............. | B01L 7/5255 |
| | | | | 506/35 |
| 2017/0219301 A1* | 8/2017 | Lin | .................. | F28F 13/00 |
| 2017/0284096 A1* | 10/2017 | Abe | .................. | F28F 13/00 |
| 2018/0246135 A1* | 8/2018 | Pan | .................. | G01P 1/023 |
| 2018/0330903 A1* | 11/2018 | Yamaguchi | ....... | G01K 7/38 |
| 2019/0016482 A1 | 1/2019 | Benthem | | |
| 2020/0025786 A1* | 1/2020 | Malvern | .......... | G01P 1/023 |

* cited by examiner

SENSOR THERMAL MANAGEMENT AND STABILIZATION UTILIZING VARIABLE CONDUCTANCE

BACKGROUND

Current practice for stabilization of inertial sensor temperatures is to use one or more variable-power heating elements mounted on a common sensor-supporting structure (known as a "sensor block"), within the sensors (typically multiple fiber-optic gyroscopes or FOGs), or in both locations simultaneously. Due to limitations on available power and potential alignment errors, and/or impact on reliability related to excessive power levels, the range of environmental temperatures over which the sensor temperature can be stabilized is limited. This limitation is usually overcome by establishing discrete temperature set points, such that the lowest set point will allow stable operation down to the lowest environmental temperature required by a certain application. Likewise, the highest set point will allow stable operation up to the highest environmental temperature required by the application. Multiple set points can be established to ensure adequate overlap of the applicable temperature ranges to account for component and system tolerances.

Due to limitations on maximum operating temperatures allowable for precision inertial navigation sensor components, each system design must include a mechanism for removing heat from the sensor-supporting structure. In prior approaches, the heat removing function has been performed either by metal brackets, or by a system of elastomeric shock-mount isolators combined with thermally conductive straps of adequate flexibility.

When using high-performance sensors which require temperature stability, heaters have been applied to allow for temperature control. During the design process, the total thermal conductance to the environment must be optimized to avoid the need for excessive heater power, while at the same time limiting the maximum sensor set point temperature needed to function at the maximum environmental temperature specified by the application. Thus, in prior approaches, the total thermal conductance to a supporting chassis has been a fixed value determined during the design process.

Unfortunately, whenever a new set point is selected, there is a period of time needed for the temperature of the sensors to transition and settle. During this period, the sensor parameters are not stable and therefore may not meet operational requirements. Further, some potential applications may not allow for the transition and settling time necessary to change the set point temperature.

Therefore, a method is needed to extend the environmental operating range for a single set point used with high-performance sensors.

SUMMARY

A system for sensor thermal management and stabilization comprises a sensor block, one or more sensors mounted on the sensor block, one or more heaters mounted on the sensor block, a chassis coupled to the sensor block, a thermal conductor moveably coupled between the sensor block and the chassis, and a thermal control actuation mechanism operatively connected to the thermal conductor. The thermal control actuation mechanism is operative to cause the thermal conductor to vary a total thermal conductance from the sensor block to the chassis by moving the thermal conductor toward the chassis or away from the chassis. The total thermal conductance is varied to provide an optimized thermal stability and optimized environmental range of applicability for the one or more sensors.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
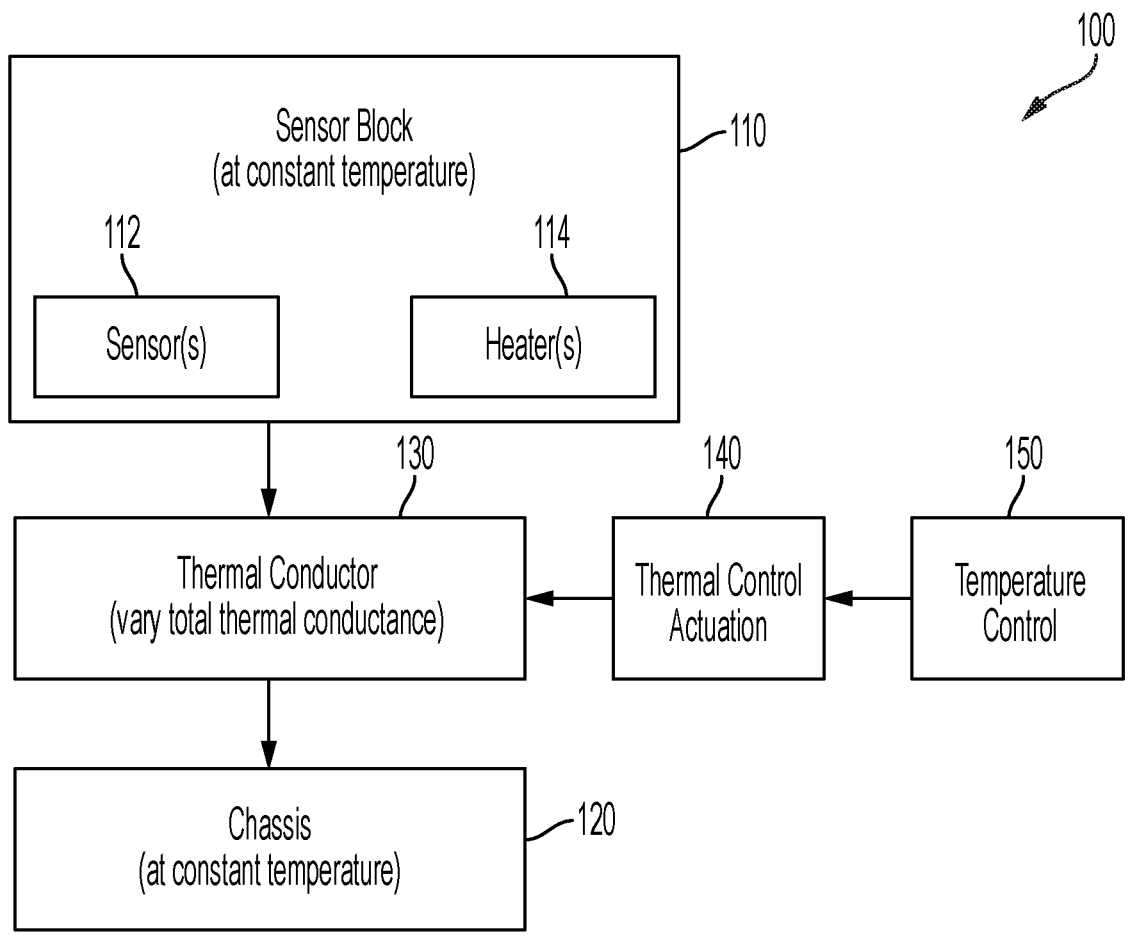
FIG. 1 is a block diagram of a system for sensor thermal management and stabilization, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for sensor thermal management and stabilization is described herein. The system and method utilize a mechanism that provides for variable thermal conductance to a supporting chassis from a sensor block that also can use variable heater power.

In one embodiment, a thermal conductor such as a flexible thermal strap can be used to conduct heat from a sensor block to a chassis. An actuator is used to vary the total thermal conductance, such as by physically moving a terminal of the thermal strap into and out of contact with the chassis. This embodiment can be extended by adding a second thermal strap with half or twice the conductance of the first thermal strap. If the design realization permits the terminals of the two thermal straps to be manipulated independently, this arrangement affords four states (i.e., using the two "bits"), providing four levels of conductance.

In another implementation, two for more flexible thermal straps can be used to conduct heat from an Inertial Sensor Assembly (ISA) block to a chassis. These flexible thermal straps are arranged to provide conductive heat paths in parallel to the heat which flows through elastomeric vibration and shock isolators coupled between the ISA block and the chassis. In one example implementation, the ISA block includes an inertial measurement unit (IMU), which utilizes one or more gyroscopes and one or more accelerometers. Such an IMU can be implemented as part of the inertial guidance system for a vehicle such an aircraft, a spacecraft, or a satellite.

In one embodiment, the flexible thermal straps comprise multiple bundles of graphite fibers, which are thermally bonded to a metal terminal at each end. The total conductance can be made variable by providing an electrically-actuated mechanism for mechanically separating one or more of the terminals from its mounting surface on the chassis, or on the sensor block, when a reduction in conductance is specified by a temperature control unit.

Various performance advantages are provided by the present system. The present approach can be used to extend the range of operation of a single controlled-temperature set point. For example, the system can be used in applications where temperature stability is maintained using controlled electrical heaters. One or more variable conductances can be utilized to reduce the maximum heater power required to maintain a stable temperature set point over a given environmental temperature range, thus providing an improved operating energy efficiency. The present system can also be used to extend the environmental temperature range over which a given heater system can maintain temperature control of a sensor block.

Optionally, a variable conductance scheme can be utilized to extend the useable environmental temperature range of a single set point without increasing the maximum heater power required. In this mode, some reduction can be taken in the maximum necessary heater power as a design tradeoff versus the maximum applicable environmental temperature range for the single set point.

Extending the useable environmental temperature range without the need for a temperature set point change can allow for inertial sensor products to be used for commercial satellites, for example.

In addition, the present system can be used in sensor devices that may require a temperature set point change, such as due to satellite internal temperature drift. Such a set point change will necessitate a pause in high-precision operations while the sensor (e.g., gyroscope) temperature settles to the new set point and the calibration of various parameters is adjusted.

For a given temperature set point, such as used for inertial sensors on a satellite, a maximum heater power is determined by a minimum board power, a maximum conductance, a maximum emissivity, and a maximum circuit drift. A minimum heater power is determined by a maximum board power, a minimum conductance, a minimum emissivity, and a minimum circuit drift.

When inertial sensors are used on space vehicles such as satellites, there is a need to keep the heaters on to maintain the stability of the gyroscope temperature. The present system expands the range of temperature set points for the heaters so as to expand the range of applicability of the heaters operating at a fixed temperature. The present system changes the thermal conductance or resistance from the sensor block to the chassis, thereby allowing a control system to extend the range of applicability of a particular temperature set point.

Further details of various embodiments are described hereafter with reference to the drawings.

FIG. 1 is a block diagram of a system 100 for sensor thermal management and stabilization, according to one embodiment. The system 100 includes a sensor block 110 that supports one or more sensors 112, such as inertial sensors, mounted to sensor block 110. The sensor block 110 also includes one or more heaters 114 having variable power, which are configured to maintain sensor block 110 at a substantially constant temperature to stabilize sensor temperature. The sensor block 110 is coupled to and separated from a supporting chassis 120 such as by one or more isolators. The chassis 120 is also at a substantially constant temperature. A thermal conductor 130, such as one or more conductive thermal straps, is moveably coupled between sensor block 110 and chassis 120. The thermal conductor 130 is operatively connected to a thermal control actuation mechanism 140. In one implementation, a temperature control unit 150 can be operatively connected to thermal control actuation mechanism 140. The temperature control unit 150 can provide for a remote-controlled mechanism of actuating the variable total thermal conductance.

During operation, thermal control actuation mechanism 140 is operative to cause thermal conductor 130 to vary a total thermal conductance from sensor block 110 to chassis 120 by moving thermal conductor 130 toward chassis 120 or away from chassis 120. When temperature control unit 150 is used, thermal control actuation mechanism 140 is responsive to a signal from temperature control unit 150 to cause thermal conductor 130 to vary the total thermal conductance from sensor block 110 to chassis 120. By varying the total thermal conductance, an optimized thermal stability and optimized environmental range of applicability for the sensors 112 is provided.

Figure 2:
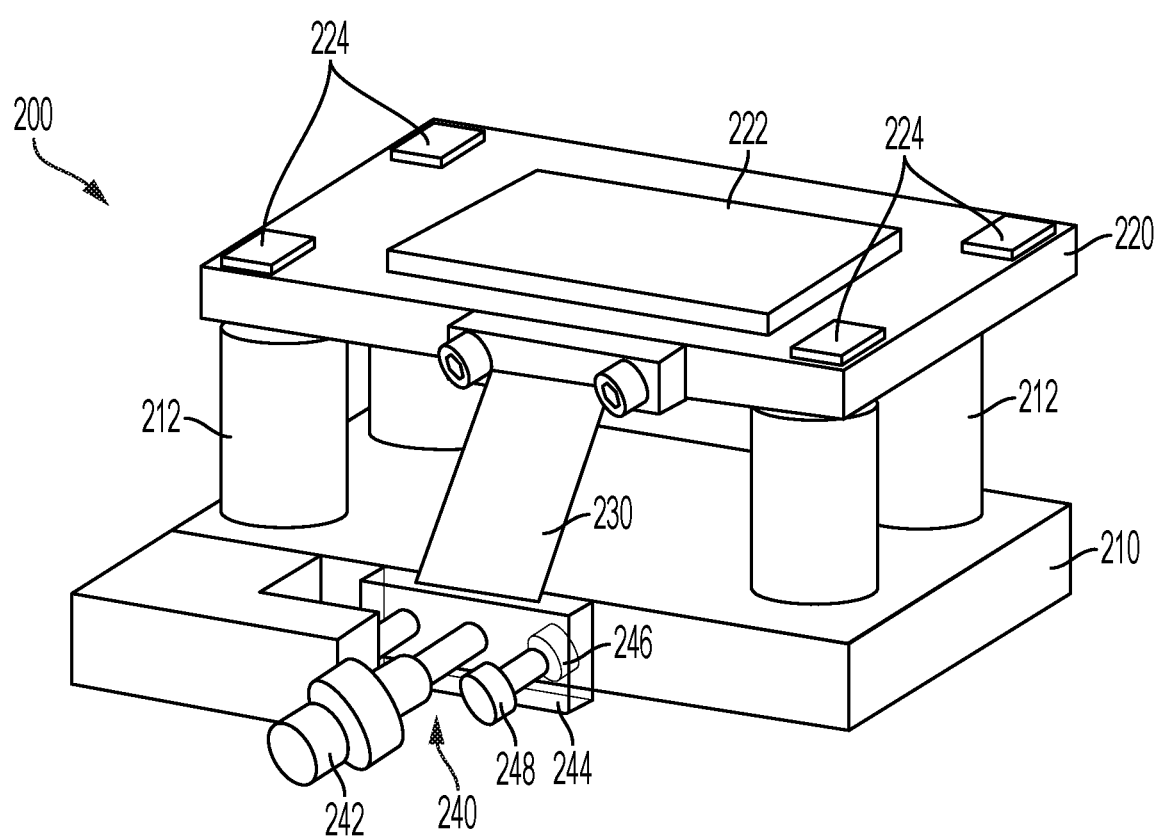
FIG. 2 is a perspective view of a system for inertial sensor thermal management and stabilization, according to an exemplary implementation.

FIG. 2 illustrates a system 200 for inertial sensor thermal management and stabilization, according to an exemplary implementation. The system 200 includes a supporting chassis 210, and a plurality of structural/thermal isolators 212 coupled to chassis 210. A sensor block 220 is coupled to isolators 212 such that sensor block 220 is separated from chassis 210 by isolators 212. One or more inertial sensors 222 are mounted to sensor block 220. One or more heaters 224 having variable power can be mounted to sensor block 220. The one or more heaters 224 are configured to maintain sensor block 220 at a substantially constant temperature to stabilize sensor temperature. In one embodiment, respective heaters 224 can be mounted on sensor block 220 above each of isolators 212, such as shown in FIG. 2.

At least one flexible conductive thermal strap 230, such as a graphite-fiber thermal strap, is moveably coupled between chassis 210 and sensor block 220. The thermal strap 230 shunts heats from sensor block 220 to chassis 210. A thermal control actuation mechanism 240 is operatively coupled to thermal strap 230. The thermal control actuation mechanism 240 is operative to cause thermal strap 230 to vary a total thermal conductance from sensor block 220 to chassis 210 by moving at least one end of thermal strap 230 into and out of contact with chassis 210.

In one embodiment, thermal control actuation mechanism 240 can include an actuator 242, a terminal block 244 coupled to thermal strap 230 and actuator 242, and at least one spring 246 engaged with terminal block 244 such as a compressed coil spring. One or more shoulder-screw guides 248 can be provided for spring 246. The actuator 242 can be implemented with a thermal actuator, such as an automatic thermally-driven actuator that includes a plunger driven by an internal meltable wax. The actuator 242 can alternatively be implemented with an electrically-controlled actuator that includes an electrical solenoid. The actuator 242 is configured to push terminal block 244 against chassis 210 to adjust the overall thermal resistance or conductance. The spring 246 is biased to push terminal block 244 away from chassis 210. When activated, actuator 242 pushes terminal block 244 against chassis 210, overcoming the force of spring 246.

During operation, thermal control actuation mechanism 240 varies the total thermal conductance from sensor block 220 to chassis 210 by physically moving terminal block 244 into and out of contact with chassis 210. In one embodiment, actuator 242 can be responsive to signals from a temperature control unit to physically move terminal block 244 into and out of contact with chassis 210, thereby varying the total thermal conductance from sensor block 220 to chassis 210 through thermal strap 230. The total thermal conductance is varied to maintain sensor block 220 at a substantially constant temperature.

In one embodiment, actuator 242 moves the bottom end of thermal strap 230 coupled to terminal block 244. The actuator 242 can pull terminal block 244 away from chassis 210 or push terminal block 244 against chassis 210, changing the overall temperature conductance or resistance from sensor block 220 at a constant temperature. This will cause the heater temperature to decrease or increase, allowing for operation over a wider environmental temperature range. For example, the necessary maximum heater power can be reduced by varying the total thermal conductance from sensor block 220 to chassis 210.

Figure 3:
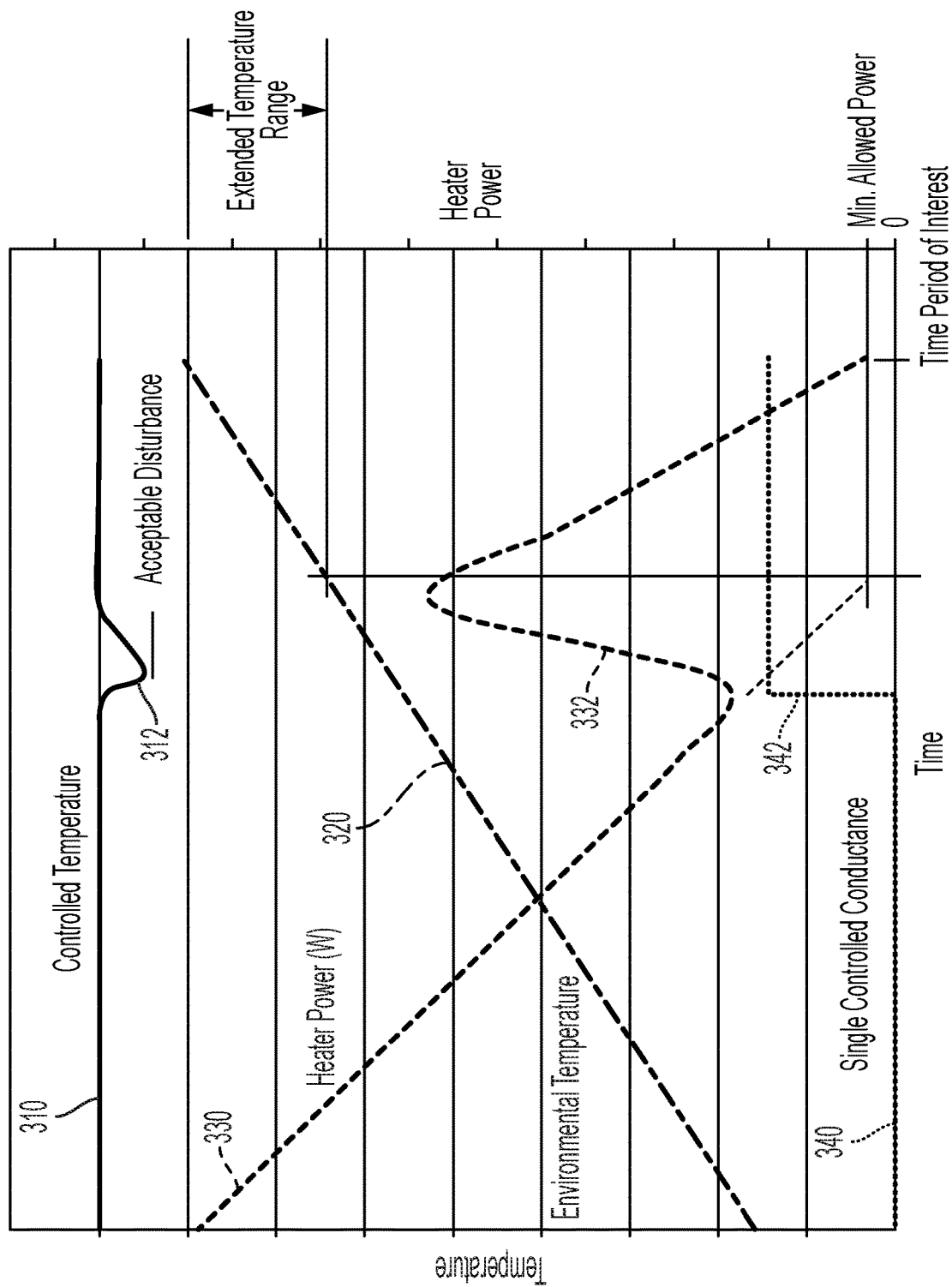
FIG. 3 is a graphical representation of a simulated thermal management scenario for an assumed linear environmental ramp of a sensor system.

FIG. 3 is a graphical representation of a simulated thermal management scenario for an assumed linear environmental ramp of a sensor system. A first curve 310 corresponds to a sensor block controlled temperature, with an acceptable disturbance 312 indicated there along at a given point in time. A second curve 320 corresponds to environmental temperature. A third curve 330 represents the estimated heater power required. A fourth curve 340 represents a single controlled thermal conductance, which is assumed for this example simulation, although the thermal conductance can be varied to reduce heater power.

To maintain the nominal set point of the sensor block temperature, the heater power is varied with environmental temperature. For example, as environmental temperature rises, the heater power is decreased, as shown in FIG. 3. If the thermal conductance is varied at a certain point in time 342 after the heater power is decreased, such as by reducing resistance or increasing conductance, the heater power can be made to increase so that the heater does not turn off by going below a minimum allowed power.

For instance, a step 332 in curve 330, indicating an increase in heater power, typically results when a thermal conductance is activated, i.e., added in parallel with the existing thermal path from the sensor package to the chassis. During a time period of interest, this allows the heater power to again be decreased as the environmental temperature continues to increase to an extended temperature range.

The plot of FIG. 3 represents the action of activating a single thermal conductance at time 342. For a system employing multiple conductances there would be multiple steps in the heater power as each conductance was activated.

EXAMPLE EMBODIMENTS

Example 1 includes a system for sensor thermal management and stabilization, the system comprising: a sensor block; one or more sensors mounted on the sensor block; one or more heaters mounted on the sensor block; a chassis coupled to the sensor block; a thermal conductor moveably coupled between the sensor block and the chassis; and a thermal control actuation mechanism operatively connected to the thermal conductor; wherein the thermal control actuation mechanism is operative to cause the thermal conductor to vary a total thermal conductance from the sensor block to the chassis by moving the thermal conductor toward the chassis or away from the chassis; wherein the total thermal conductance is varied to provide an optimized thermal stability and optimized environmental range of applicability for the one or more sensors.

Example 2 includes the system of Example 1, wherein the thermal conductor comprises at least one thermal strap.

Example 3 includes the system of Example 2, wherein the at least one thermal strap comprise a graphite-fiber thermal strap.

Example 4 includes the system of any of Examples 2-3, wherein the thermal control actuation mechanism includes an actuator, a terminal block coupled to the at least one thermal strap and the actuator, and at least one spring engaged with the terminal block.

Example 5 includes the system of Example 4, wherein the actuator comprises an automatic thermally-driven actuator.

Example 6 includes the system of Examples 4, wherein the actuator comprises an electrically-controlled actuator.

Example 7 includes the system of any of Examples 1-6, further comprising a temperature control unit operatively connected to the thermal control actuation mechanism.

Example 8 includes the system of Example 7, wherein the thermal control actuation mechanism is responsive to a signal from the temperature control unit to cause the thermal conductor to vary the total thermal conductance from the sensor block to the chassis.

Example 9 includes the system of any of Examples 7-8, wherein the temperature control unit provides a remote-controlled mechanism to actuate variance of the total thermal conductance.

Example 10 includes the system of any of Examples 1-9, wherein the one or more heaters are configured to maintain the sensor block at a substantially constant temperature.

Example 11 includes the system of any of Examples 1-10, wherein the chassis is coupled to the sensor block with one or more isolators.

Example 12 includes the system of any of Examples 1-11, wherein the one or more sensors comprise one or more inertial sensors.

Example 13 includes the system of Example 12, wherein the one or more inertial sensors are implemented in an inertial measurement unit (IMU).

Example 14 includes the system of Example 13, wherein the IMU is implemented in a vehicle comprising an aircraft, a spacecraft, or a satellite.

Example 15 includes a system for inertial sensor thermal management and stabilization, the system comprising: a sensor block; one or more inertial sensors mounted on the sensor block; one or more heaters mounted on the sensor block; one or more isolators coupled to the sensor block; a chassis coupled to the one or more isolators such that the chassis is separated from the sensor block; at least one thermal strap moveably coupled between the chassis and the sensor block; a thermal control actuation mechanism operatively coupled to the at least one thermal strap; wherein the thermal control actuation mechanism is operative to cause the at least one thermal strap to vary a total thermal conductance from the sensor block to the chassis by moving at least one end of the at least one thermal strap into and out of contact with the chassis; wherein the total thermal conductance is varied to provide an optimized thermal stability and optimized environmental range of applicability for the one or more inertial sensors.

Example 16 includes the system of Example 15, wherein the thermal control actuation mechanism includes an actuator, a terminal block coupled to the at least one thermal strap and the actuator, and at least one spring engaged with the terminal block.

Example 17 includes the system of Example 16, wherein the actuator comprises an automatic thermally-driven actuator that includes a plunger driven by an internal meltable wax.

Example 18 includes the system of Example 16, wherein the actuator comprises an electrically-controlled actuator that includes an electrical solenoid.

Example 19 includes the system of any of Examples 15-18, further comprising a temperature control unit operatively connected to the thermal control actuation mechanism; wherein the thermal control actuation mechanism is responsive to a signal from the temperature control unit to cause the at least one thermal strap to vary the total thermal conductance from the sensor block to the chassis.

Example 20 includes the system of any of Examples 15-19, wherein the total thermal conductance is varied to maintain the sensor block at a substantially constant temperature.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for sensor thermal management and stabilization, the system comprising:
    a sensor block having an upper surface and an opposing lower surface;
    one or more sensors mounted on the upper surface of the sensor block;
    a plurality of heaters mounted on the upper surface of the sensor block, the plurality of heaters separated from the one or more sensors by the sensor block;
    a plurality of thermal isolator structures coupled to the lower surface of the sensor block:
    a chassis coupled to the plurality of thermal isolator structures such that the chassis is separated from the sensor block;
    a thermal conductor moveably coupled between the sensor block and the chassis, the thermal conductor comprising at least one flexible thermally conductive strap; and
    a thermal control actuation mechanism connected to the thermal conductor and to the chassis, the thermal control actuation mechanism including an actuator, a terminal block coupled to the at least one flexible thermally conductive strap and the actuator, and at least one spring engaged with the terminal block, the at least one spring coupled to the chassis;
    wherein each of the plurality of heaters is respectively located on the upper surface of the sensor block opposite a respective one of the plurality of thermal isolator structures:
    wherein the thermal control actuation mechanism is operative to cause the thermal conductor to vary a total thermal conductance from the sensor block to the chassis by moving the thermal conductor toward the chassis or away from the chassis;
    wherein the total thermal conductance is varied to provide an optimized thermal stability and optimized environmental range of applicability for the one or more sensors.

2. The system of claim 1, wherein the at least one flexible thermally conductive strap comprises a graphite-fiber thermal strap.

3. The system of claim 1, wherein the at least one spring is biased to push the terminal block away from the chassis, and when activated, the actuator pushes the terminal block against the chassis, overcoming the force of the at least one spring.

4. The system of claim 3, wherein the actuator comprises an automatic thermally-driven actuator.

5. The system of claim 3, wherein the actuator comprises an electrically-controlled actuator.

6. The system of claim 1, wherein the thermal control actuation mechanism is operative to cause the thermal conductor to vary the total thermal conductance from the sensor block to the chassis.

7. The system of claim 1, wherein the plurality of heaters are configured to maintain the sensor block at a substantially constant temperature.

8. The system of claim 1, wherein the plurality of thermal isolator structures are elastomeric.

9. The system of claim 1, wherein the one or more sensors comprise one or more inertial sensors.

10. The system of claim 9, wherein the one or more inertial sensors are implemented in an inertial measurement unit (IMU).

11. The system of claim 10, wherein the IMU is implemented in a vehicle comprising an aircraft, a spacecraft, or a satellite.

12. A system for inertial sensor thermal management and stabilization, the system comprising:
    a sensor block having an upper surface and an opposing lower surface;
    one or more inertial sensors mounted on the upper surface of the sensor block;
    a plurality of heaters mounted on the upper surface of the sensor block, the plurality of heaters separated from the one or more inertial sensors by the sensor block;
    a plurality of thermal isolator structures coupled to the lower surface of the sensor block, wherein the plurality of thermal isolator structures have a substantially cylindrical shape;
    a chassis coupled to the plurality of thermal isolator structures such that the chassis is separated from the sensor block;
    at least one flexible thermally conductive strap moveably coupled between the chassis and the sensor block; and
    a thermal control actuation mechanism coupled to the at least one flexible thermally conductive strap and to the chassis, the thermal control actuation mechanism including an actuator, a terminal block coupled to the at least one flexible thermally conductive strap and the actuator, and at least one spring engaged with the terminal block, the at least one spring coupled to the chassis;
    wherein each of the plurality of heaters is respectively located on the upper surface of the sensor block opposite a respective one of the plurality of thermal isolator structures;
    wherein the thermal control actuation mechanism is operative to cause the at least one flexible thermally conductive strap to vary a total thermal conductance from the sensor block to the chassis by moving at least one end of the at least one flexible thermally conductive strap into and out of contact with the chassis;
    wherein the total thermal conductance is varied to provide an optimized thermal stability and optimized environmental range of applicability for the one or more inertial sensors.

13. The system of claim 12, wherein the actuator is configured to push the terminal block against the chassis to adjust the overall thermal resistance or thermal conductance.

14. The system of claim 13, wherein the actuator comprises an automatic thermally-driven actuator that includes a plunger driven by an internal meltable wax.

15. The system of claim 13, wherein the actuator comprises an electrically-controlled actuator that includes an electrical solenoid.

16. The system of claim 12, wherein the thermal control actuation mechanism is operative to cause the at least one flexible thermally conductive strap to vary the total thermal conductance from the sensor block to the chassis.

17. The system of claim 12, wherein the total thermal conductance is varied to maintain the sensor block at a substantially constant temperature.

* * * * *